(12) United States Patent
Beretta

(10) Patent No.: US 7,814,824 B2
(45) Date of Patent: Oct. 19, 2010

(54) COFFEE MACHINE HAVING A DISPENSER WITH INDEPENDENT HEATING

(75) Inventor: Maurizio Beretta, Binasco (IT)

(73) Assignee: Gruppo Cimbali S.p.A., Binasco MI (IT)

(*) Notice: Subject to any disclaimer, the term of this patent is extended or adjusted under 35 U.S.C. 154(b) by 629 days.

(21) Appl. No.: 11/826,944

(22) Filed: Jul. 19, 2007

(65) Prior Publication Data
US 2008/0017041 A1    Jan. 24, 2008

(30) Foreign Application Priority Data
Jul. 24, 2006   (EP)   .................... 06425520

(51) Int. Cl.
*A47J 31/00*    (2006.01)
(52) U.S. Cl. ................... 99/282; 99/281; 99/302 R; 426/433
(58) Field of Classification Search ............ 99/281, 99/282, 295, 302 R, 307; 426/433, 435
See application file for complete search history.

(56) References Cited
U.S. PATENT DOCUMENTS

| 4,137,833 A * | 2/1979 | Yelloz | 99/293 |
| 5,259,297 A * | 11/1993 | Giuliano | 99/282 |
| 5,551,331 A * | 9/1996 | Pfeifer et al. | 99/280 |
| 5,975,365 A * | 11/1999 | Hsieh | 222/129.4 |
| 7,654,191 B2 * | 2/2010 | Greenwald et al. | 99/275 |

FOREIGN PATENT DOCUMENTS

| EP | 0 465 877 | 1/1992 |
| EP | 1 354 543 | 10/2003 |

* cited by examiner

*Primary Examiner*—Reginald L Alexander
(74) *Attorney, Agent, or Firm*—Nixon & Vanderhye PC

(57) ABSTRACT

The present invention relates to a coffee machine, whose dispensing unit has a heat generator which is independent of the boiler of the machine, valves for opening and cutting off the cold water pipe and hot water pipe which supply the dispensing unit, a temperature sensor which is arranged in the dispensing unit and control means which are connected to the valves, the temperature sensor and the heat generator in order to allow the preparation of different types of coffee, even in succession. The present invention also relates to a method for making coffee.

16 Claims, 1 Drawing Sheet

COFFEE MACHINE HAVING A DISPENSER WITH INDEPENDENT HEATING

BACKGROUND OF THE INVENTION

Figure 1:
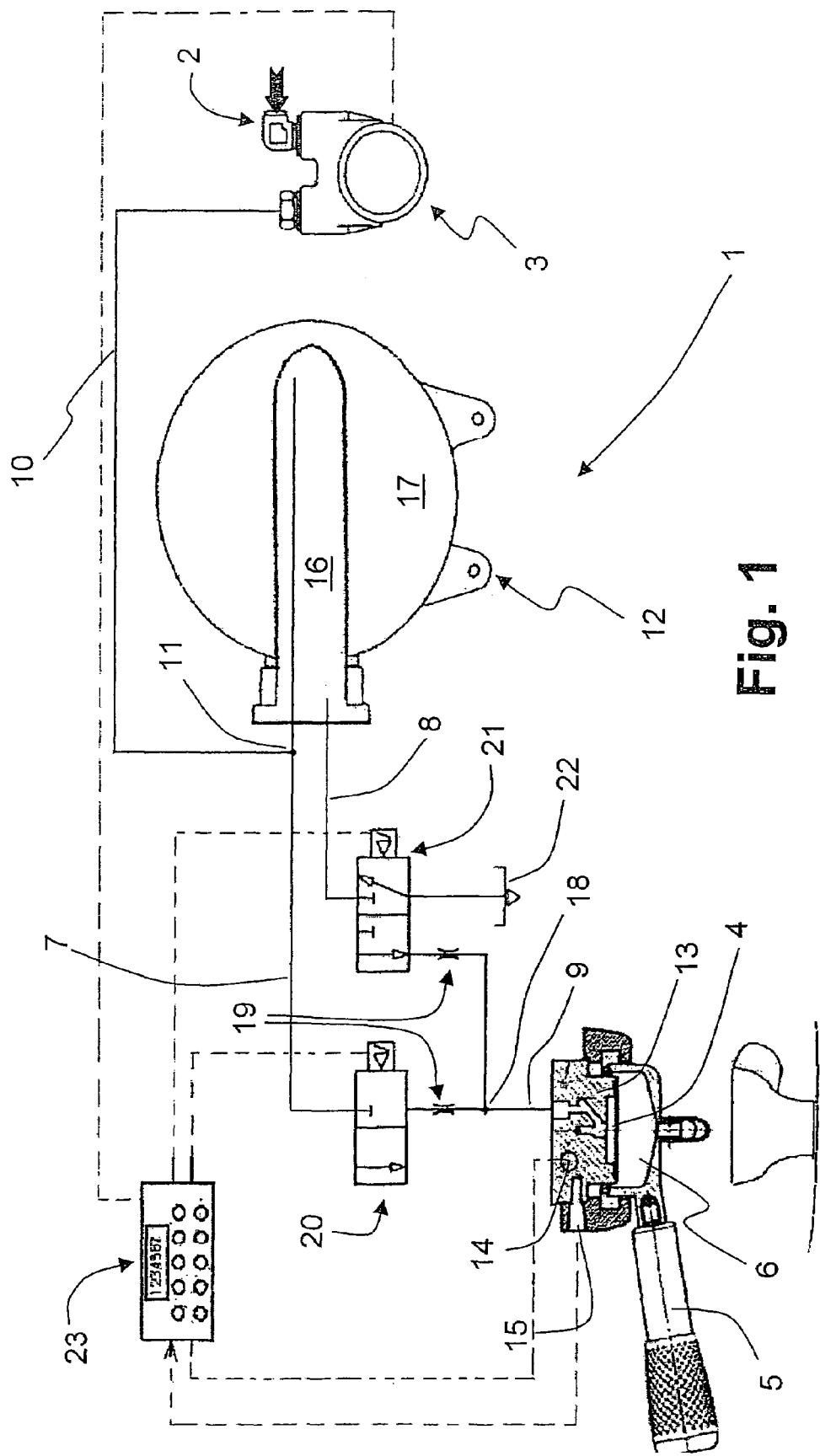

The present invention relates to a coffee machine having a dispenser provided with independent heating and to a method for preparing coffee in accordance with said machine.

Coffee (the beverage) has always been very widespread and popular; in fact, nowadays it is available in a number of varieties which differ from each other both in terms of the starting mixture and in terms of the means of extraction (temperature and time of extraction, quantity of water used, etc.).

The automated preparation of coffee has been the subject of a number of developments, substantially directed towards ensuring that water could always be available, at the desired time, at the ideal temperature, at the required pressure and in the necessary quantities.

Among the most recent developments, it is certainly possible to include the machine described in patent application EP1074210. That machine comprises a dispenser which is connected to the boiler by way of a means for controlling the thermosiphon circulation and can be controlled both so as to dispense coffee of the Mediterranean type (obtained with from 15 to 25 ml of water at approximately 98° C. which passes through the mixture of ground coffee for approximately 30 seconds), and so as to dispense café crème (obtained from light blends, in which from 100 to 120 ml of water at approximately 90° C. are caused to flow in approximately 20 seconds through the ground coffee) which is more widespread in northern Europe.

Changing over from one control type to the other, however, requires long and complex operations to be carried out for calibrating the control valve which, precisely owing to the length thereof, cannot be carried out during daily use of the machine in a bar or in another public place.

Currently, machines possess an ever greater number of functions and an ever increasing proportion of those is electronically controlled, affording the operators the possibility of using ad hoc programmes for an ever increasing number of different services and/or beverages.

The increasing availability around the world of espresso coffee has led to an increase in the demand for variety and quality of the beverages.

OBJECTS AND SUMMARY OF THE INVENTION

It is an object of the present invention to provide a coffee machine having greater flexibility than that of machines known in the art so that it is also possible to produce, on the same machine, different types of coffee, even as alternatives, without this involving a diminution in the quality of the coffee produced or any long waiting times for the start-up and calibrating operations.

In order to achieve that greater flexibility, the applicant has developed a system for controlling the dispensing of the water which always ensures the correct temperature of the water, independently of the type of coffee which is requested.

DETAILED DESCRIPTION OF THE PREFERRED EMBODIMENT

The features and advantages of the present invention will become clear from the following detailed description of one practical embodiment, given purely by way of non-limiting example with reference to the single FIGURE, in which there are schematically represented a hydraulic circuit and a control circuit for a coffee machine in accordance with an embodiment of the present invention.

The FIGURE shows a cup, in which hot coffee is poured from the spout of an infusion unit 5, which is fixed in known manner to a dispensing unit 13.

The coffee machine comprises, at the inner side thereof, a hydraulic circuit, generally designated 1, which in turn comprises inlet means 2 which connect the hydraulic circuit 1 to a suitable source of water, for example, the water mains, which is generally at low temperature (2°-20° C.).

The coffee machine is further provided with connections for electrical energy and, generally, at least one pump 3 which is arranged upstream of the hydraulic circuit 1 in the immediate vicinity of the inlet means 2.

The coffee machine comprises, at the opposite end of the hydraulic circuit 1 relative to the inlet means 2, a dispensing portion 4, through which the water at temperature is dispensed into an infusion unit 5 which defines the infusion chamber 6 and is generally constructed by means of an element that is separate from the coffee machine but which can be fixedly joined thereto.

The inlet means 2 and the dispensing portion 4 are placed in fluid communication with each other by at least one cold water pipe 7 and one hot water pipe 8.

The cold and hot water pipes coincide along an end portion 9 which terminates in the dispensing portion 4; in the event that the inlet means 2 comprise a single inlet for mains water which is common to the cold water and hot water pipes, the pipes coincide in an initial portion 10 in the region of the inlet means 2, too.

In that case, represented in the FIGURE, the hydraulic circuit 1 comprises suitable flow division elements 11 to passively subdivide and/or actively control the ratio between the flow of water of the portions of cold water pipe 7 and hot water pipe 8 which are arranged downstream.

The cold water pipe 7 places the dispensing portion 4 in fluid communication with the inlet means 2, without providing any specific element for varying the temperature of the water which flows through it.

The hot water pipe 8, however, comprises heating means 12 which are capable of substantially increasing the temperature and/or the pressure of the water which flows inside the hot water pipe 8 itself.

The heating means 12 are upstream of the dispensing portion 4 and downstream of the flow division elements 11 which, when present, separate the flow portion which will have to be heated from that which will not have to be heated.

The dispensing portion 4 and at least a portion of the end portion 9 are constructed inside the dispensing unit 13, which serves to bring about engagement with the infusion unit 5 and direct the flow of water at temperature from the dispensing portion 4 so that it can pass through the infusion chamber 6, extracting the coffee flavours in the most homogeneous manner possible.

The temperature of the dispensing unit 13 must be maintained as close as possible to the temperature of the water which flows in the end portion 9 so that the temperature of the water is not subjected to variations owing to the thermal differential with respect to the dispensing unit 13 when it flows therein.

In this manner, it is possible to ensure a high level of quality of the coffee produced by the machine.

In order to ensure that the dispensing unit 13 can be maintained at the desired temperature, that is, in order to compensate for the heat losses owing to dissipation in the external environment, a heat generator 14, which is separate from the heating means 12 which are interposed upstream of the hot water pipe 8, is provided inside the dispensing unit 13.

The heat generator 14 therefore takes the place of the function which, in thermosiphon circulation machines, was carried out directly by the hot water which flowed inside the dispensing unit 13.

The heat generator 14 can advantageously be a resistor, preferably connected to the main electrical power supply of the coffee machine in such a manner that the electrical power consumed by it is subtracted from the electrical power available for the other consumes.

Since the electrical power consumed by the electrical mains network depends only on the heat dissipated, the electrical power consumed by the heat generator 14 in order to heat the dispensing unit 13 does not have to be consumed by the heating means 12 in order to heat that portion of water which, previously, was used in order to indirectly heat the dispensing unit 13.

In that manner, it becomes possible to install a new machine in place of an old one without having to modify the electrical system of the premises in which the old machine was installed.

The dispensing unit 13 also comprises a temperature sensor 15 which can generate a signal indicating the temperature of the dispenser itself.

The dispensing unit 13 is constructed from thermally conductive material, preferably metal.

The heating means 12 advantageously comprise a heat exchanger 16 which is fitted in the boiler 17 of the machine; alternatively, they can be constituted by the boiler 17 itself which receives cold water from the initial portion 10 of the hot water pipe.

Therefore, the exchanger 16 receives heat from the boiler 17 and heats the water contained in the cold water pipe 8 up to a temperature Tc. The temperature Tc is selected so as to allow a high level of efficiency of the boiler 17 and is generally between 110° C. and 125° C. so that the machine can always be provided with hot water for any requirement.

The cold water pipe 7 remains separate from the hot water pipe 8 as far as a mixing location 18, which defines the start of the end portion 9.

Upstream of the mixing location 18, there are provided, both in the cold water pipe 7 and in the hot water pipe 8, respective chokes 19 for controlling the flow rates and, upstream thereof, there are provided a first valve 20 and a second valve 21, respectively; those valves can advantageously be constituted by solenoid valves.

The second valve 21 can advantageously be connected downstream of the heating means 12 and, in the event that it is a three-way valve, it can also be connected to an outlet 22 in order to discharge the residual pressure downstream thereof, in the hot water pipe 8 and/or from the end portion 9.

The machine also comprises control means 23 which are connected to the heat generator 14 and/or the temperature sensor 15 and/or each of the valves 20, 21 and/or the pump 3 in such a manner as to receive therefrom the signals and/or to control each of them.

In that manner, they can receive the signal which is representative of the temperature of the dispensing unit 13 from the temperature sensor 15 and consequently control the heat generator 14 in order to increase, if necessary, the temperature of the dispensing unit 13 up to the desired value.

The valves 20 and 21 can, for example, be controlled by the control means 23 so as to allow the passage of pulses of cold water in the cold water pipe 7 and pulses of hot water in the hot water pipe 8, respectively.

At the same time, the connection of the control means 23 to the valves 20 and 21 allows control of the flow of the cold water pipe 7 and hot water pipe 8, respectively, and therefore control of the temperature of the water which flows downstream of the mixing location 18 inside the end portion 9.

The coffee machine can advantageously also comprise a selector (not illustrated in the FIGURE), for example, a rotary selector or a push-button type selector, which allows the operator to select the programme in accordance with which the coffee is to be prepared.

That selector is connected to the control means 23 in order to determine the manner in which they must interpret the data received in order to control the valves 20 and 21 and/or the heat generator 14 and/or the pump 3.

Two possible operating modes of the coffee machine will be described below in accordance with an embodiment of the present invention and will show how the temperature of the dispensing unit 13 can be rapidly and effectively increased or decreased in the event that it is not already the temperature required for preparing a coffee of the desired type.

Considering, for example, the step for preparing a Mediterranean coffee: higher temperature, smaller flows of water and smaller volumes with respect to café crème.

In that case, when the operator acts on the selector, for example, by pressing the push-button corresponding to Mediterranean coffee, the control means 23 verify that the temperature of the dispensing unit 13 corresponds to that provided for by the programme; if the temperature is too low, a signal is transmitted to the heat generator 14 which heats the dispensing unit 13 until it reaches the correct temperature.

Valves 20 and 21 are controlled in such a manner that, downstream of the mixing location 18, in the end portion 9, the temperature of the water corresponds to that required for Mediterranean coffee.

In this manner, water and dispensing unit 13 have the same temperature and the water is not subjected to any variation in temperature during its passage through the dispensing unit 13.

Since the temperature must be the correct one not so much at the start of the end portion 9 but rather inside the infusion chamber 6, it is clearly possible to set the programmes of the control means 23 in such a manner that both the temperature of the mixed water at the start of the end portion 9 and the temperature of the dispensing unit 13 are such that the optimum temperature of the water is obtained inside the infusion chamber 6. This requires only simple initial calibration operations which can readily be carried out once for each type of coffee.

Optionally, it is also possible to combine the heating effect produced by the heat generator 14 with the heating effect produced by the water which passes through the end portion 9: by suitably controlling the valves 20 and 21, it is possible, knowing the temperature of the dispensing unit 13 and the structural parameters, to select the temperature of the water in such a manner that it is slightly hotter when it passes through the dispensing pipe 15 than would be necessary.

In that manner, during the passage through the dispensing pipe 15, the water imparts heat to the dispensing unit 13, bringing about the dual effect of reaching the correct temperature for preparing the coffee and accelerating the heating of the dispensing unit 13 itself.

The control means 23 advantageously comprise means for dynamically determining the temperature of the water which must be conveyed in the end portion 9 both in accordance with the type of beverage which has to be prepared (that is, the necessary flow, volume and temperature of water) and in accordance with the design specifications of the machine (thermal inertia values of the elements in which the water flows, passage times, measured temperature, instantaneous electrical power of the heat generator 14, etc.).

In this manner, it is possible to convey to the end portion 9 water which, at the beginning of the step for preparing the coffee, is slightly hotter and, consequently, as the dispensing unit 13 gradually becomes hotter, to reduce the temperature of the water conveyed to the end portion 9 until it reaches the correct operating temperature.

The valves 20 and 21 can be adjusted so as to determine with precision the ratio between the flow of hot water and the flow of cold water.

Advantageously, it is possible to provide additional temperature sensors (not illustrated) which are arranged both in the cold water pipe 7 and in the hot water pipe 8 so as to provide the control means with the necessary information for even more precise adjustment of the operational timing of the valves 20, 21 and more precise adjustment of the final temperature of the water which flows downstream of the mixing location 18 inside the end portion 9.

In the event that, after a Mediterranean coffee, it is desired to prepare a type of coffee which requires a lower temperature, for example, a café crème, it might be necessary to cool the dispensing unit 13 in order to prevent it from excessively heating the infusion water.

When the operator sends the command to prepare the café crème, the control means 23, on the basis of the programming data, measure the temperature of the dispensing unit 13 and convey water at a temperature that is slightly lower than the optimum temperature so that, when the water comes into contact with the dispensing unit 13, it receives the necessary heat therefrom in order to reach the correct temperature, at the same time cooling the dispensing unit 13.

In that case, it is also possible to carry out dynamic control of the temperatures: the structural parameters being known, in accordance with the variation in temperature of the dispensing unit 13, the control means 23 will advantageously be able to operate the valves 20 and 21 in such a manner that the water which flows in the end portion 9 has a variable temperature, so as to acquire the heat which the dispensing unit 13 is able to impart thereto, in order always to reach the infusion chamber 6 at the same correct temperature.

These functional examples have described the means by which it is possible to adjust the temperature of the dispensing unit 13 by acting both on the heat generator element 14 and on the dynamic mixing of the flows of water, controlled by the valves 20 and 21.

Naturally, a person skilled in the art, for the purposes of satisfying contingent and specific requirements, may apply a number of modifications and variants to the above-described configurations without, however, departing from the scope of protection of the invention as defined by the appended claims.

What I claim is:

1. A coffee machine comprising:
    inlet means for allowing the introduction of water from the external environment, the water having an inlet temperature;
    a dispensing portion which can allow liquid to be dispensed into a container which is external relative to the coffee machine;
    a cold water pipe which places the inlet means in fluid communication with the dispensing portion and which has a first valve which can be controlled to open and cut off the cold water pipe;
    a hot water pipe which places the inlet means in fluid communication with the dispensing portion and which comprises heating means which can heat water therein to a temperature that is substantially higher than the inlet temperature, and a second valve which can be controlled to open and cut off the hot water pipe;
    an infusion unit which can contain the ground coffee and a dispensing unit which comprises the dispensing portion and which can engage with the infusion unit;
    a heat generator which is separate from the heating means;
    a temperature sensor;
    control means which are connected both to the temperature sensor and to at least one of the valves;
    said heat generator and said temperature sensor being provided inside the dispensing unit.

2. A coffee machine according to claim 1, wherein the control means are able to control the at least one valve in accordance with the temperature measured by the temperature sensor.

3. A coffee machine according to claims 1 or 2, wherein the control means are able to control the heat generator in accordance with the temperature measured by the temperature sensor.

4. A coffee machine according to claim 1, wherein the heat generator is a resistor.

5. A coffee machine according to claim 1, wherein there are provided selector means so as to modify the response of the control means to the signal generated by the temperature sensor, for at least a portion of the possible signals which can be generated by the temperature sensor.

6. A coffee machine according to claim 1, wherein the heat generator is connected to the control means.

7. A coffee machine according to claim 1, wherein the cold water pipe and the hot water pipe are joined at a mixing location defining the start of an end portion terminating in the dispensing portion.

8. A method for preparing coffee comprising:
    providing a coffee machine comprising:
    inlet means for allowing the introduction of water from the external environment, the water having an inlet temperature;
    a dispensing portion which can allow liquid to be dispensed into a container which is external relative to the coffee machine;
    a cold water pipe which places the inlet means in fluid communication with the dispensing portion and which has a first valve which can be controlled to open and cut off the cold water pipe;
    a hot water pipe which places the inlet means in fluid communication with the dispensing portion and which comprises heating means which can heat water therein to a temperature that is substantially higher than the inlet temperature, and a second valve which can be controlled to open and cut off the hot water pipe;
    an infusion unit which can contain the ground coffee and a dispensing unit which comprises the dispensing portion and which can engage with the infusion unit;
    a heat generator which is separate from the heating means;
    a temperature sensor;
    control means which are connected both to the temperature sensor and to at least one of the valves;
    said heat generator and said temperature sensor being provided inside the dispensing unit, and
    using the signal from the temperature sensor of the machine in order to control at least one of the valves of the machine.

9. A method according to claim 7, wherein the signal from the temperature sensor is used in order to control the heat generator of the machine.

10. A method according to claim 8, wherein the at least one valve is controlled in pulse mode so as to generate pulses of water downstream thereof.

11. A method according to claim 8, wherein the at least one valve is controlled so as to obtain, in the end portion, a predetermined water temperature.

12. A method according to claim 8, wherein the at least one valve is controlled so as to obtain, in the end portion, a predetermined water temperature selected by the operator in order to obtain a specific beverage before the control means actuate the at least one valve.

13. A method according to claim 8, wherein the at least one valve is controlled so as to obtain, in the end portion, a predetermined temperature is selected from a plurality of predetermined temperatures by selecting one from a plurality of selections offered by selector means, which allow the selection of one from a plurality of functional programmes of the machine.

14. A method according to claim 8, wherein the at least one valve is controlled so as to obtain, in the end portion, a predetermined temperature and the selector means set one of a plurality of control programmes, the control programmes defining, during operation, at least two different temperatures for the water which flows in the end portion.

15. A method according to claim 8, wherein programmes define at least two different quantities of water which have to pass through the dispensing location.

16. A method according to claim 8, wherein the temperature of the water in the end portion is substantially equal to the temperature of the dispensing unit.

* * * * *